3,089,451
TRANSDUCER PITCH CONTROL FOR ECHO CONTROLLED TORPEDO

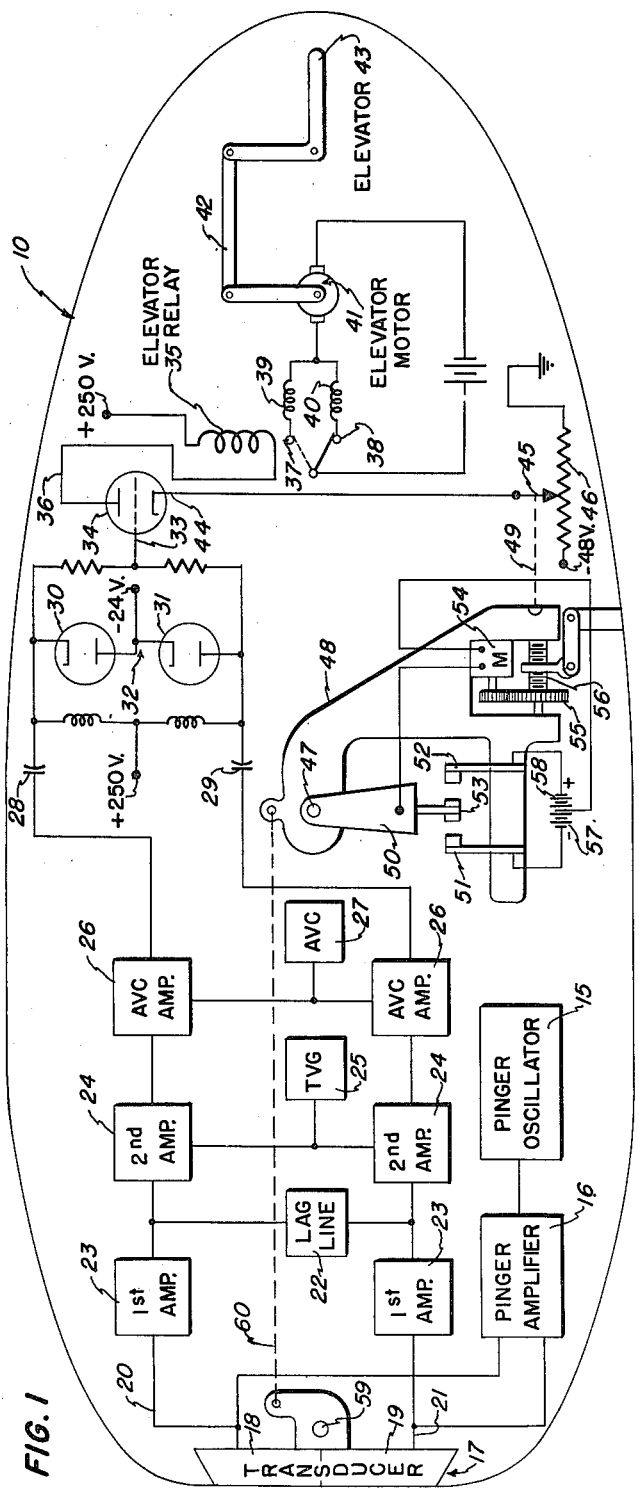

Paul C. Gardiner, Scotia, N.Y., assignor, by mesne assignments, to the United States of America as represented by the Secretary of the Navy
Filed Oct. 4, 1950, Ser. No. 188,463
8 Claims. (Cl. 114—23)

The invention relates to an improved echo controlled torpedo and more specifically to a stabilized transducer.

In the art of torpedo control by sound, one of the greater problems is the reduction of high reverberation relative to echo magnitude. After the pulses of high frequency power are transmitted, numerous false echoes produced by reverberation are reflected back by particles in the water, thermoclines and from the surface or bottom depending upon the dimensions of the projected beam and the effect of the thermoclines upon these reflections. As the target is made less reflective, reverberation becomes relatively worse. Some previously tried expedients for the reduction of reverberation and its effects are the use of shorter pings, more restricted average pitch, frequency modulation and reverberation controlled gain amplification.

An important object of the present invention is to provide improved means for reducing reverberation relative to target echo strength.

Another object is the provision of equipment stabilizing the transducer with its axis horizontal.

A further object is to provide echo controlled torpedo steering gear with elevator or depressor follow-up control means responsive to changes in torpedo pitch.

Another object is the provision of echo controlled torpedo steering gear with follow-up control means adapted to stabilize the transducer.

Other objects and advantages of the invention will become apparent during the course of the following detailed description, taken in connection with the accompanying drawing forming a part of this specification, and in which drawing:

FIG. 1 is a diagrammatic view of the echo controlled torpedo including the stabilized transducer;

FIG. 2 is a diagrammatic view illustrating the operation of the echo controlled torpedo during a dive with the transducer stabilized to maintain level lobes.

In the drawing, which for the purpose of illustration shows only a preferred embodiment of the invention, the numeral 10 designates the echo controlled torpedo.

Pulses or pings of 60-kc. voltage and 30 milliseconds' duration are generated and amplified by a pinger oscillator 15 and amplifier 16 and sent out every 0.8 second through a transducer 17 whose vertically spaced sections 18, 19 are connected in parallel during this transmission by a pinger relay (not shown). The supersonic waves leave the transducer and, if there is a target present within range, are reflected back as echoes. Upon reaching the transducer, these echoes are translated into electrical input signal voltages in dual amplifier channels 20, 21, the two parts of the transducer acting independently during reception.

If an echo returns from a target below the axis of the transducer, the wave front will strike the lower half of the transducer first and the signal voltage generated in the lower half will lead in phase that generated in the upper half. Likewise, if the echoes are from a target above the axis of the transducer, the signal voltage in the upper half will lead that in the lower half. This phase difference is converted into an amplitude difference by the lag line 22 following the first stage 23 of dual amplification. At the second amplifier stage 24, the overall sensitivity of the receiver is gradually increased during each reception interval by a time-variation-of-gain (TVG) control 25. This TVG control prevents false tripping on reverberation immediately following the ping and also prevents amplifier overloading on strong echo signals at close range. Although the separate outputs of the amplifiers vary in amplitude with variations in target size, the ratio between these two outputs stays constant with constant target angle and phase relation.

In the final amplification stage 26, an automatic volume control (AVC) 27 on the dual amplifiers keeps their output down so that the greater output of the dual channel is always close to a predetermined amplitude, if the target size is above a certain threshold value. The smaller output of the two channels will then have a value determined solely by the target angle.

The radio frequency dual outputs are transmitted through condensers 28, 29 to the oppositely connected diodes 30, 31 of a differential rectifier 32, and the resulting D.C., proportional to the target angle, is applied to the grid 33 of a follow-up amplifier tube 34. The condensers 28, 29 are large enough to hold a steady voltage with a time constant of several seconds.

A relay 35 in the plate circuit 26 of the follow-up tube includes contacts 37, 38 adapted to energize alternate reversing circuits 39, 40 of an elevator motor 41. This elevator motor is operatively connected as by linkage 42 to the torpedo elevator 43.

Connected to the cathode 44 of the follow-up tube 34 is the variable pick-off arm 45 of a potentiometer 46 energized by a —48 volt source.

Supported for swinging movement about an axis transversely of the torpedo, as by a fixed pivot 47, is a carriage 48 mechanically coupled, as indicated by broken line 49, to the potentiometer arm 45. Also pivoted at 47 relative to the carriage 48 is a pendulum 50 adapted to swing between spaced negative and positive contacts 51, 52 on the carriage. Carried by the pendulum is a dual contact 53 adapted on swinging of the pendulum, to engage either one of the contacts 51, 52 and thereby control the polarity of energization of a motor 54. This motor 54 is adapted, through the provision of reduction gearing 55 and a threaded shaft connection 56, to swing the carriage forwardly upon energization by a current source 57 through the negative contact 51, and rearwardly upon energization by a current source 58 through the positive contact 52. Thus the arrangement is such that the pendulum 50, in swinging forwardly or rearwardly, will engage one of the contacts 51, 52, depending on the direction of swing, and thereby effect rotation of the motor 54 in a direction to forwardly or rearwardly displace the contact carriage 48 a distance sufficient to compensate for the change in pitch of the torpedo body.

The transducer 17 is ganged with the contact carriage 48 for swinging movement about a pivot 59 transversely of the torpedo body, as by a mechanical link indicated by broken line 60. Thus the transducer is stabilized with its lobe axis 61 horizontal even though the pitch 62 of the torpedo body 10 may vary considerably during target search and pursuit.

In operation, the incoming D.C. signal which is proportional to the target angle, is impressed on and temporarily holds the grid 33 of the follow-up tube at a certain voltage. The amplification factor of the follow-up tube 34 is so high that a variation of plus or minus one volt at the grid 33 will cause the elevator relay 35 to open or close. Thereupon the elevator steering motor 41 operates to change the setting of the elevator 43. The resultant change of pitch of the torpedo body produces relative swinging movement of the pendulum 50 followed by similar movement of the motor-driven carriage 48. The movement changes the setting of the potentiometer arm 45 whereby the cathode voltage of the follow-up tube moves to nearly the value of voltage on the grid. The relay 35 then returns to its original position and waits for another one volt change. Since the relay 35 has only two positions, the torpedo keeps changing pitch a degree or two, the cathode as a result keeps moving about one volt, and the relay is alternately opened and closed.

For a dive toward a target below the level of the transducer, the grid voltage moves plus or minus depending on the polarity selected, an amount depending on the angle of the target below horizontal. This may, for example, be a negative change from −24 volts to −43 volts. This change is of course more than enough to cut off the tube 34. For a second or two thereafter, the tube remains nonconductive until the steering motor operates to change the pitch of the torpedo and the carriage motor 54 in turn changes the setting of the potentiometer arm 45. Thus the −43 volts of the grid quickly becomes matched by the cathode voltage with an error of approximately plus or minus 1 volt. As 1 volt changes in bias occur, the torpedo pitches one or two degrees from the pitch average at which the torpedo is running due to the demand of the differential rectifier 32.

For a climb, the grid voltage of the follow-up tube 34 moves in the opposite direction. This may, for example, be a positive change from −24 volts to −3 volts, assuming positive polarity changes to have been chosen for climb. The resultant flow of plate current closes the elevator relay 35 thus causing energization of the steering motor and shifting the elevator for climb. As the torpedo pitches upwardly, the contacts 52, 53 of the carriage 48 and pendulum 50 engage, thus energizing the motor 54 for rotation in a direction to rearwardly displace the carriage. This action readjusts the potentiometer setting and quickly runs the cathode voltage of the follow-up tube 34 to the vicinity of the grid voltage where it remains, subject to variations of plus or minus 1 volt, until the demand of the differential rectifier 32 changes.

From the foregoing description, it is clear that the motorized pendulum carriage 48, through the steadying action of the mechanical connection 60, automatically stabilizes the transducer with its lobe axis 61 horizontal, while the torpedo is climbing or diving, thus allowing the transducer to transmit and listen in the best average position for minimizing ocean bottom and surface reverberation. Instead of mechanically maintaining the transducer level by a motor drive, a fairly simple electrical shifting of the transducer lobes may be accomplished by motorized operation of a switch or variable inductor, upon demand from the pendulum or a gyro.

Although a presently preferred arrangement of acoustically controlled torpedo depth steering gear has been illustrated and described in detail, it is to be distinctly understood that such is disclosed merely for the purpose of illustration, the details or even the entire assemblage being subject to variation inasmuch as any suitable acoustically controlled torpedo depth steering gear may be used.

Various changes may be made in the form of invention herein shown and described without departing from the spirit of the invention or the scope of the following claims.

What is claimed is:

1. In an echo controlled torpedo, a transducer adapted to project a directive acoustic signal, said transducer being adjustable to vary the pitch angle of said signal relative to the torpedo, depth steering gear adapted to change the pitch of the torpedo in accordance with the direction of return of echoes of said signal, a pendulum so mounted as to swing relative to the torpedo upon pitching thereof and means controlled by said pendulum adapted to stabilize said transducer relative to the horizontal, whereby a selected direction of pitch of said transducer signal chosen for its suitability in the minimization of reverberation may be maintained notwithstanding changes in torpedo pitch.

2. In an echo controlled torpedo, a transducer adapted to project a directive acoustic signal in the direction of its axis, said transducer being adjustable to vary the pitch angle of said signal relative to the torpedo, a pendulum so mounted as to swing relative to the torpedo upon pitching thereof, means including a motor controlled by said pendulum adapted to stabilize said transducer relative to the horizontal whereby a selected direction of pitch of said transducer signal chosen for its suitability in the minimization of reverberation may be maintained notwithstanding changes in torpedo pitch, and depth steering gear adapted to change the pitch of the torpedo in accordance with the direction of return of echoes of said acoustic signal relative to the transducer axis.

3. In an echo controlled torpedo, a depth steering motor having alternate reversing circuits for horizontal rudder operation in opposite directions, means including a transducer adapted to project a directional acoustic signal, said transducer being adjustable to vary the pitch angle of said signal relative to the torpedo means including a pendulum so mounted as to swing relative to the torpedo upon pitching thereof, said last mentioned means being adapted to select one of said alternate reversing circuits for energization, and means controlled by said pendulum adapted to stabilize said transducer relative to the horizontal, whereby a selected direction of pitch of said transducer signal chosen for its suitability in the minimization of reverberation may be maintained notwithstanding changes in torpedo pitch.

4. In an echo controlled torpedo, a depth steering motor having alternate reversing circuits for horizontal rudder operation in opposite directions, means including a transducer adapted to project a directional acoustic signal, means including a pendulum controlled switch and a reversible motor energized by said switch adapted to stabilize said transducer relative to the horizontal, an echo signal receiver energized by said transducer including a relay device adapted to select one of said alternate reversing circuits for energization according to the direction of return of echoes of said acoustic signal, and means controlled by said pendulum and motor adapted to exert follow-up control on said depth steering motor through said relay device responsive to torpedo pitch control.

5. In an echo controlled torpedo, a steering motor having alternate reversing circuits for horizontal rudder operation in opposite directions, means including a transducer adapted to project a directional acoustic signal, an echo signal receiver adapted to supply a voltage of a magnitude and polarity commensurate with the pitch angle of reception of an echo of said signal, means including a pendulum controlled regulator adapted to supply a voltage of a magnitude and polarity commensurate with the pitch of said torpedo, means adapted to select one of said alternate reversing circuits for energization depending on the sign of the differential of said voltages, and means controlled by said pendulum adapted to stabilize said transducer relative to pitch.

6. In an echo controlled torpedo, a steering motor having alternate reversing circuits for horizontal rudder operation in opposite directions, an electron tube amplifier having a plate, a cathode and a control electrode, means including a plate circuit for said amplifier adapted to control said alternate reversing circuits, means including a transducer adapted to project a directional acoustic signal, an echo signal receiver adapted to supply a voltage of a magnitude and polarity commensurate with the pitch angle of reception of an echo of said signal, means including a pendulum controlled regulator adapted to supply a voltage of a magnitude and polarity commensurate with the pitch of said torpedo, means impressing said voltages on different electrodes of the tube to affect its conductivity, and means controlled by said pendulum adapted to stabilize said transducer relative to pitch.

7. In an echo controlled torpedo, a steering motor having alternate reversing circuits for horizontal rudder operation in opposite directions, an electron tube amplifier having a plate, a cathode and a control electrode, a plate circuit including a relay adapted to control said alternate reversing circuits, means including a transducer adapted to project a directional acoustic signal, an echo signal receiver adapted to supply a voltage of a magnitude and polarity commensurate with the pitch angle of reception of an echo of said signal, means including a pendulum controlled regulator adapted to supply a voltage of a magnitude and polarity commensurate with the pitch of said torpedo, means impressing said voltages on different electrodes of the tube to affect its conductivity, and means controlled by said pendulum adapted to stabilize said transducer relative to pitch.

8. In an echo controlled torpedo, a steering motor having alternate reversing circuits for horizontal rudder operation in opposite directions, an electron tube amplifier having a plate, a cathode and a control electrode, means including a plate circuit for said amplifier adapted to control said alternate reversing circuits, means including a transducer adapted to project a directional acoustic signal, an echo signal receiver adapted to impress on said control electrode a voltage of a magnitude and polarity commensurate with the pitch angle of reception of an echo of said acoustic signal, means including a pendulum controlled regulator adapted to impress on said cathode a voltage of a magnitude and polarity commensurate with the pitch of said torpedo, said tube having a high amplification factor whereby the tube forms a good conductor of plate current when biased slightly less than cut-off bias, and motorized means controlled by said pendulum adapted to stabilize said transducer relative to pitch.

References Cited in the file of this patent
UNITED STATES PATENTS

| | | |
|---|---|---|
| 478,813 | Paine | July 12, 1892 |
| 1,121,563 | Leon | Dec. 15, 1914 |
| 2,407,697 | William | Sept. 17, 1946 |
| 2,420,676 | Peterson | May 20, 1947 |
| 2,538,156 | Keto | Jan. 16, 1951 |